Jan. 19, 1954 W. SHOCKLEY 2,666,814

SEMICONDUCTOR TRANSLATING DEVICE

Filed April 27, 1949 3 Sheets-Sheet 1

INVENTOR
W. SHOCKLEY
BY
[signature]
ATTORNEY

SEMICONDUCTOR TRANSLATING DEVICE

Filed April 27, 1949 3 Sheets-Sheet 2

INVENTOR
W. SHOCKLEY
BY R. J. Guenther
ATTORNEY

Jan. 19, 1954 W. SHOCKLEY 2,666,814

SEMICONDUCTOR TRANSLATING DEVICE

Filed April 27, 1949 3 Sheets-Sheet 3

INVENTOR
W. SHOCKLEY
BY
ATTORNEY

Patented Jan. 19, 1954 2,666,814

UNITED STATES PATENT OFFICE 2,666,814

SEMICONDUCTOR TRANSLATING DEVICE

William Shockley, Madison, N. J., assignor to Bell Telephone Laboratories, Incorporated, New York, N. Y., a corporation of New York Application April 27, 1949, Serial No. 89,969

9 Claims. (Cl. 179—171)

This invention relates to signal translating devices of the general type disclosed in the application, Serial No. 35,423, filed June 26, 1948, of W. Shockley, now Patent 2,569,347 granted September 25, 1951, comprising a body of semi-conductive material having therein two or more abutting zones of opposite conductivity type. More particularly, it relates to such devices wherein, like in those disclosed in the application, Serial No. 87,618 filed April 15, 1949, of G. L. Pearson and W. Shockley, now abandoned, zones of one conductivity type are produced in a semi-conductive body of the opposite conductivity type by bombardment of the body with nuclear particles.

One general object of this invention is to improve the performance characteristics and facilitate the construction of semiconductor translating devices wherein the semiconductive body comprises discrete zones of opposite conductivity type.

More specifically, objects of this invention are to increase the operating frequency range of such translating devices, and particularly of devices of the type which have come to be known as transistors, enable control of the conversion of N-type material to P-type, obtain zones of one conductivity type in a body of the opposite conductivity type and of prescribed degrees of conversion, area and depth, and facilitate the production of semiconductive bodies of a variety of desirable forms and having regions of different conductivity type.

In one embodiment illustrative of and constructed in accordance with features of this invention, a transistor comprises a body of N-type germanium having on one face thereof a thin layer of P-type germanium and two spaced zones of N-type germanium in the outer face portion of the P-layer, the junctions between these zones and the layer serving as the emitter and collector of the device.

In accordance with one specific feature of this invention, the layer is formed by bombardment of one face of the N-type body with nuclear particles and the N-type zones in the layer are produced by masking the surface areas of the layer from the bombarding particles.

In another illustrative embodiment of this invention, a semiconductor translating device comprises a body of germanium having an inner region or zone of one conductivity type between two surface zones of the opposite conductivity type. In accordance with another feature of this invention, as exemplified in devices of this construction, the zones are produced by nuclear bombardment of the germanium body and the conductivity type of the several zones is predetermined by control of the intensity of the bombarding particles. Thus, for example, the combination of an N zone between two P zones is produced by bombardment of an N-type body with particles of such energies that only surface layers or regions of the body are transformed to P conductivity type. Similarly, the combination of a P zone intermediate two N zones can be produced by controlling the energy of the incident particles and the intensity of the bombardment so that only an intermediate region of the body is converted to P-type.

The bombardment to effect conversion may be effected in a number of ways. For example, deuterons or protons as produced in a cyclotron or other particle accelerator may be utilized as the nuclear particles. Also alpha particles emanating from natural radioactive sources such as radium, polonium and plutonium may be used.

Some of the conversion to P-type may be relatively unstable and may be eliminated by aging at room temperature. Also the units may be heat treated at temperatures of 100° C. to 400° C. for short periods of time ranging from a few minutes to a few days so as to stabilize them against further aging under operating conditions.

The invention and the above-noted and other features thereof will be understood more clearly and fully from the following detailed description with reference to the accompanying drawing in which.

Figure 1:
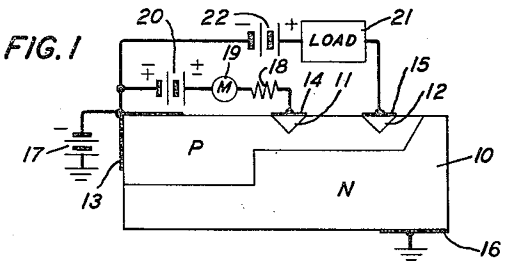
Fig. 1 shows diagrammatically a semiconductor translating device illustrative of one embodiment of this invention.

Referring now to the drawing, the transistor amplifier illustrated in Fig. 1 comprises a semiconductive element 10, for example of germanium, having a body portion designated N, of N conductivity type and a surface portion or layer, designated P, of P conductivity type on the body portion. As illustrated, the P layer is thicker at one end of the element; advantageously the thicker portion is of more intense P-type than the thinner portion. The element 10 may be in the form of a block, wafer or strip. For example, it may be a rectangular block of the order of 0.10 centimeter long, 0.20 centimeter wide and 0.025 centimeter thick, the length and thickness dimensions being horizontal and vertical respectively in Fig. 1. The element comprises also a pair of parallel, wedge shaped strip portions 11 and 12, which are of N conductivity type and extend across the P layer. These may be of the order of 0.002 centimeter wide, 0.002 centimeter maximum depth and spaced, center to center, of the order of 0.004 centimeter.

Ohmic connections, for example in the form of electroplated coatings of rhodium, 13, 14 and 15 are provided to the P layer and the N-type portions 11 and 12 respectively. In accordance with the nomenclature used in this art, these connections are termed the base, emitter and collector respectively. An ohmic connection 16, similar to the others above mentioned, is provided on the N-type body.

In one manner of operation of the transistor, the N-type body is grounded as shown and the base 13 is biased negative with respect to ground by the source 17. The input circuit is connected between the base 13 and emitter 14 and includes a resistor 18, the input signal source 19 and the direct current source 20 for biasing the emitter at a low potential, usually negative although in some cases positive, relative to the base. The output circuit is connected between the base and the collector and includes the load 21 and the direct current source 22 for biasing the collector at a relatively high potential with respect to the base. In a typical device, the emitter bias may be of the order of 0.2 volt negative in respect to its zero current or floating bias, the collector bias 30 volts positive, and the input resistor and load 500 ohms and 20,000 ohms respectively. Amplified replicas of input signals impressed by the source 19 are produced at the load.

As will be developed hereinafter, the P-type layer may be very thing, for example of about 0.002 centimeter thick. Inasmuch as the transit time for electron flow between the emitter and collector regions, and also the spread in transit times, is dependent to a considerable extent upon the volume of the material through which the current flows, it will be appreciated that the constraint upon current paths resulting from such a thin layer leads to small transit times and small spread in these times.

It will be noted that the junction between the N body and the P layer is biased in the reverse direction. Hence, the body serves essentially as a passive support for the layer. Further, inasmuch as the portion of the layer adjacent the base 13 is of intensive P-type, electron emission from the base is substantially prevented.

The body 10, in one illustrative construction, may be of high back voltage N-type germanium produced for example in the manner described in the application, Serial No. 638,351, filed December 29, 1945, of J. H. Scaff and H. C. Theuerer, now Patent 2,602,211 granted July 8, 1952.

The transistor body illustrated in Fig. 1 and described hereinabove, more particularly the P-type layer and the N-type regions in this layer, may be formed by bombardment of the body of semiconductive material with nuclear particles. Illustrative of particles which may be utilized are deuterons and protons as produced in a cyclotron or other nuclear particle accelerating device and alpha particles from natural radioactive substances such as radium, plutonium and polonium. The principal factors of moment in the processes will appear from the following considerations.

N-type conductivity germanium, can be converted or transformed to P-type by nuclear bombardment of a body of the N-type material. The depth and intensity of the conversion are dependent upon the energy of the bombarding particles and the period of exposure of the body to these particles. Roughly, each nuclear particle produces one P-type center in germanium. The number of centers requisite to produce conductivities of the order of magnitude commonly associated with germanium is about $10^{15}$ per cubic centimeter. Thus, in order to convert a 0.01 centimeter surface layer of N-type germanium to P-type requires about $10^{13}$ centers per square centimeter of surface. Now the beam from a cyclotron or other nuclear accelerator is expressed usually in microamperes, one microampere being equivalent to $6.7 \times 10^{12}$ electrons per second. Hence, in order to convert a 0.01 centimeter deep surface layer, an exposure for about two seconds to a beam of about 1 microampere per square centimeter of surface is required.

Typical examples will indicate the relationships. In one case, a 0.012 thick surface layer of P-type germanium was formed on an N-type body by bombarding a surface of the body with deuterons of 8.5 m. e. v. energy, for about two seconds. In another, a 0.002 centimeter thick layer of P-type was produced on an N-type body of germanium by exposure of the body for 2 hours to alpha radiation from polonium, the particle energy being about 5 m. e. v.

Figure 3:
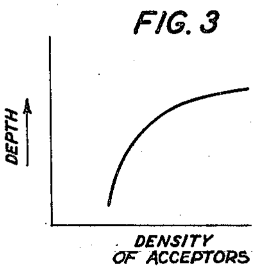
Fig. 3 is a graph indicating the intensity of conversion as a function of depth of penetration of the body, by bombarding nuclear particles.

The depth of penetration of the nuclear particles, and hence the thickness of the P-type layer produced, increases with the particle energy. However, the density of the acceptors produced, or stated in another way, the intensity of the conversion of N-type to P-type is not entirely uniform throughout the depth of the layer. In general, the greatest loss of energy by the particles obtains at its maximum penetration, so that the intensity of conversion is greater inward of the bombarded face of the body. The relationship between depth of penetration and acceptor density is illustrated graphically in Fig. 3. Of course, it will be appreciated that the depth of penetration is dependent upon the angle of incidence, being greatest for normal incidence, inasmuch as the particle paths are substantially linear.

Figure 2A:
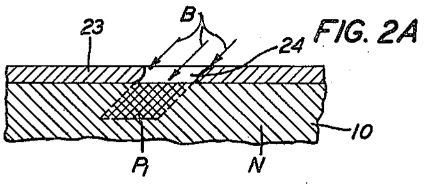
Figs. 2A and 2B are diagrams illustrating one way in which N-type regions or zones may be produced in a P-type layer, in accordance with this invention.
Figure 2B:
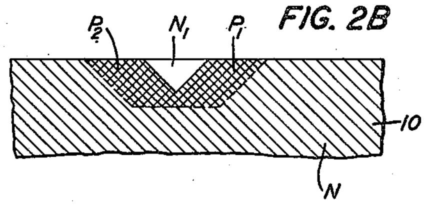

From the foregoing discussion, it is apparent how a P layer of different thicknesses, such as illustrated in Fig. 1, and such a layer with an intense P region adjacent the base may be produced. The manner of forming the N-type strips 11 and 12 in the P layer will be understood from the following discussion with particular reference to Figs. 2A and 2B. As illustrated in the former figure, a mask or shield 23 of a suitable material is placed upon or adjacent the N-type body 10, the mask having an elongated aperture 24 therein and being of such character as to prevent penetration therethrough of the bombarding particles. The latter are directed against the mask or screen along paths indicated by the arrows B and only those directed against the aperture 24 penetrate the body N. Consequently, a section $P_1$ of the N body is transformed in conductivity type. The mask is then shifted and the direction of bombardment is changed so that a second section, $P_2$ in Fig. 2B, is converted in conductivity type. Thus, as illustrated in Fig. 2B, there is produced a wedge-shaped section $N_1$ of N conductivity type in a P-type section $P_1$, $P_2$ on the N-type body. Both the N-type sections 11 and 12 in the device shown in Fig. 1 may be produced in this manner, the remainder of the P layer, in addition to the portions $P_1$ and $P_2$ about each section 11 and 12 being produced by appropriate direction of the bombarding particles.

Figure 4:
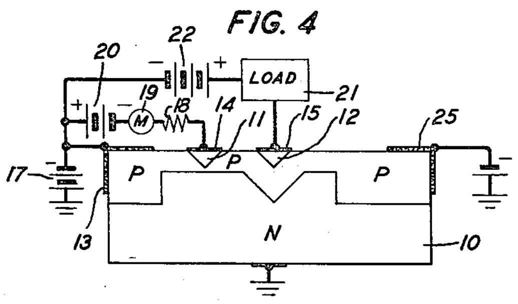
Fig. 4 shows a semiconductor translating device illustrative of another embodiment of this invention.

The translating device illustrated in Fig. 4 is similar to that shown in Fig. 1 and described hereinabove, but includes an additional ohmic connection 25 to the end of the P layer remote from the base 13. The connection 25 is biased so as to produce an accelerating field in the direction from the emitter region 11 to the collector region 12 thereby to reduce the electron transit time between these regions and, consequently, extend the operating frequency range of the device. The function of an accelerating electrode and the operation of devices including such electrode are discussed in the application, Serial No. 50,894, filed September 24, 1948, of J. R. Haynes and W. Shockley, now Patent 2,600,500 granted June 17, 1952.

It will be noted that all parts of the P layer and also both electrodes 13 and 25 are negative with respect to the N-type body, so that the layer is operating in the reverse direction relative to the base and, consequently, draws but a very small current. Typical of the biases which may be employed in the device illustrated in Fig. 4 are, all being relative to ground, base 13—5 volts negative, emitter 11—2.5 volts negative, collector 12—15 volts positive, and accelerator 25—0.5 volt negative.

Advantageously, as illustrated in Fig. 4, in the vicinity of the collector 12, the P layer is made somewhat larger in order to reduce the field between the collector and the N-type body.

Although in the devices illustrated in Figs. 1 and 4 and described hereinabove the N sections in the P layer are wedge-shaped and extend across the P layer, it will be understood that they may be of other forms. For example, one or both of these sections may be in the form of conical islands in the P layer, formed for example by directing the bombarding particles slantwise against the surface and around a circular mask on this surface.

Figure 5:
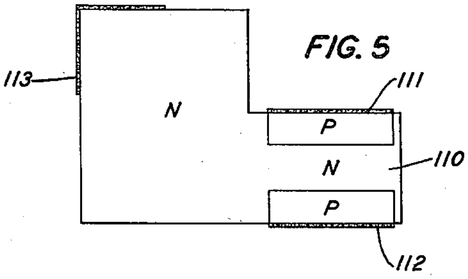
Figs. 5 and 6 illustrate still other devices embodying features of this invention.
Figure 6:
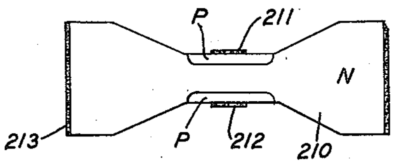

Two other illustrative constructions of semiconductor translating devices which may be formed by nuclear bombardment are depicted in Figs. 5 and 6. In both of these, the emitter and collector are defined by P—N junctions. Specifically, in the construction shown in Fig. 5, two regions, designated P, on opposite faces of the N-type block 110 are formed by nuclear bombardment of the block. Ohmic emitter and collector connections 111 and 112 respectively are made to the two P-type portions. The ohmic base connection 113 is established at one end of the N-type block. The thickness of the N material between the two portions may be approximately $2\times10^{-4}$ to $2\times10^{-3}$ centimeter, the outer P layers may be $2\times10^{-3}$ centimeter thick, and the large N portion, at the left in the figure, may be 0.01 centimeter long and 0.05 centimeter high.

In the device illustrated in Fig. 6, the N-type body 210 is a disc having a central portion of reduced thickness and in opposite faces of which P-type regions, to which emitter and collector connections 211 and 212 respectively are made, are produced by nuclear bombardment. The base connection 213 may be a coating upon the periphery of the disc.

Figure 7A:
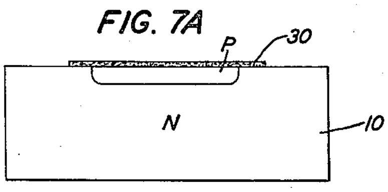
Figs. 7A and 7B illustrate one way, in accordance with this invention, in which ohmic connections may be produced on converted zones or regions.
Figure 7B:
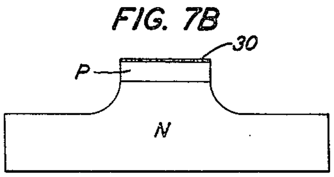

In constructions, such as illustrated in Figs. 5 and 6, the ohmic emitter, collector and base connections may be made in one way by electroplating the body, after formation of the P-type regions, with a suitable contact metal, for example rhodium, and then removing all of the coating except that upon the desired areas by a suitable solvent. The connections to the P-type regions may be prepared also in the manner illustrated in Figs. 7A and 7B. Specifically, a metallic coating 30, such as of rhodium, is applied to one face of an N-type body 10. This face is then subjected to nuclear bombardment through the metallic coating to produce a P-type surface region in the N body. Then, a restricted prescribed area of the coating is masked and the body is subjected to abrasive action, for example blasting with grit such as silicon carbide granules, 60 mesh, to remove portions of the coating, P region and N body. The resulting structure is a P-type layer upon an N-type body with an ohmic connection to the P layer, as illustrated in Fig. 7B.

Figure 8:
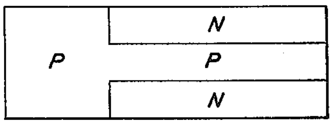
Fig. 8 shows still another construction of semiconductor signal translating device illustrative of this invention.

The device illustrated in Fig. 8 comprises, as indicated, a P-type body having adjacent opposite faces thereof zones of N-type material. In the fabrication of the device, opposite faces, the upper and lower faces in the figure, of a body of N-type material, specifically germanium, are subjected to nuclear bombardment, for example by deuterons. As has been pointed out heretofore, the maximum conversion effect obtains near the maximum penetration of the particles into the body. Thus, by controlling the energy of the particles and the time of exposure thereto, an inner layer or region of the body can be converted to P-type without conversion of the surface regions, whereby, as illustrated at the right in Fig. 8 an inner P layer is formed between two surface regions of N-type. Also, by controlling the parameters noted, all of a zone of the body, as indicated at the left in Fig. 8, can be converted to P-type. A base connection may be made to this zone or region and emitter and collector connections made to the two N-type regions.

Figure 9:
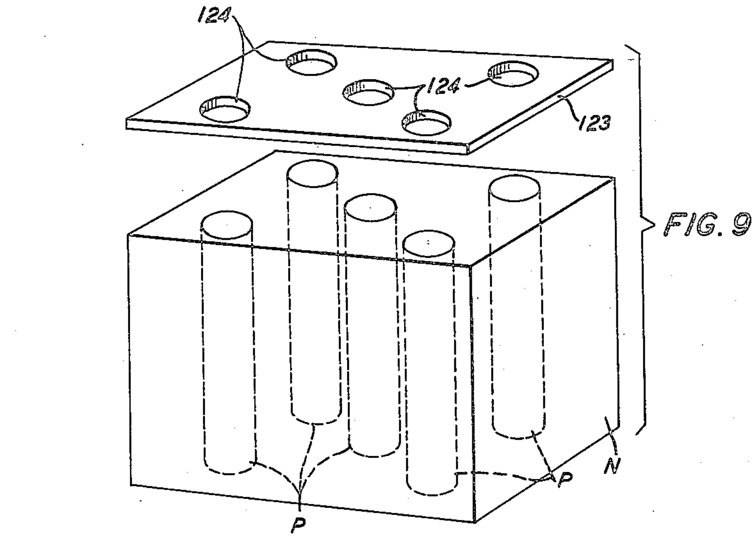
Fig. 9 illustrates one way of producing discrete rod-like zones of one conductivity type in a body of the opposite conductivity type.
Figure 10:
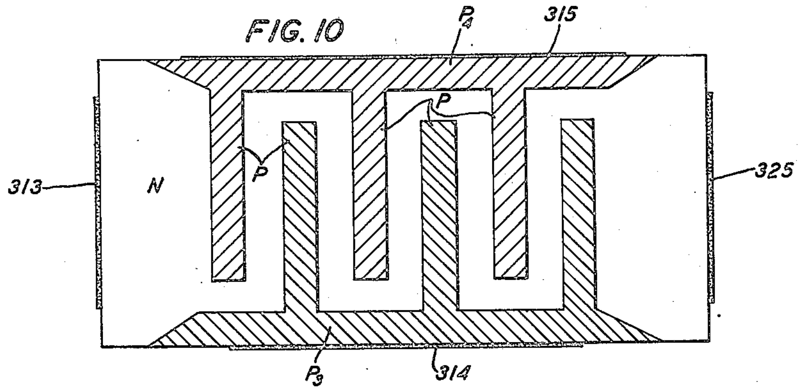
Fig. 10 is a side view of a translating device illustrative of another embodiment of this invention.

Other devices embodying features of this invention are illustrated in Figs. 9 and 10. In the former, as illustrated, rod-like P-type zones are produced in a body of N-type germanium by subjecting only spaced regions of one face of the body to nuclear bombardment. This may be effected by interposing between this face and the particle source a stopping mask or shield 123 having circular apertures 124 therein. Only those regions of the body exposed to the source through the apertures 124 will be converted from N-type to P-type.

The P zones may be connected together electrically and serve as one terminal of a diode rectifier, the N-body constituting the other terminal.

The transistor illustrated in Fig. 10 comprises two groups of rod-like P zones or regions each group extending from a respective face of an N-type germanium body, and the zones of the two groups being interspaced. The P zones may be produced in the N body by bombardment of the two faces through a mask in the manner described hereinabove in connection with Fig. 9, and the regions of each group may be connected together by surface regions of P-type, indicated at $P_3$ and $P_4$. These regions may be produced by subjecting the two faces of the N body to bombardment with nuclear particles of substantially less penetration than those employed to produce the rod-like P regions.

Emitter, collector, base and accelerator connections 314, 315, 313 and 325 respectively may be made at the N body and P layers, $P_3$ and $P_4$ as shown and the device utilized in a circuit in the manner illustrated in Fig. 4. Of course, the accelerator connection may be omitted or grounded and the device operated in the manner shown in Fig. 1.

In a device of the form illustrated in Fig. 10, one or several rows of the rod-like P-type zones may be employed. In an illustrative structure including a single row of such zones with one group of alternate P zones operated as emitters and the remaining zones as collectors, the zones may be of the order of 0.02 centimeter deep, 0.004 centimeter in diameter and spaced, side to side, 0.002 centimeter.

Figure 11:
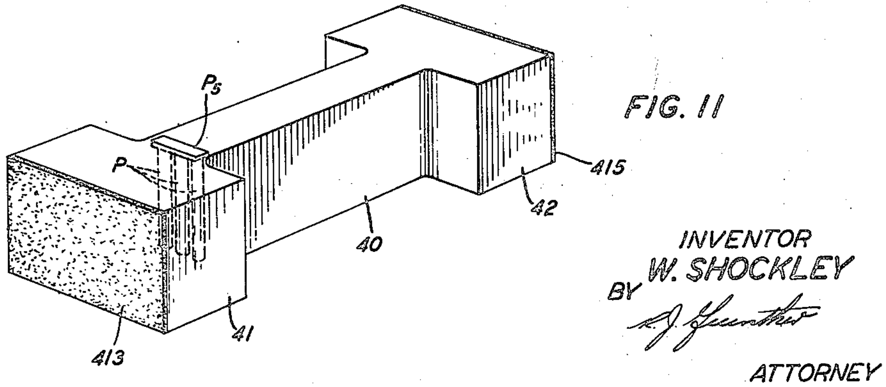
Fig. 11 is a perspective view of the bridge form of transistor exemplifying features of this invention.

Rod or column-like P zones in an N-type body, produced as in the manner described hereinabove in connection with Figs. 9 and 10, may be utilized also as emitter or collector or both in bridge or filamentary translating devices of the type disclosed in Patent 2,502,479 granted April 4, 1950 to G. L. Pearson and W. Shockley. A typical construction is illustrated in Fig. 11 and comprises a thin body of N-type germanium having an elongated intermediate portion 40 and enlarged end portions 41 and 42 to which ohmic base and collector connections 413 and 415 respectively are made. The emitter is constituted by the rod-like P zones connected at the outer end by the P-type layer $P_5$.

Figure 12:
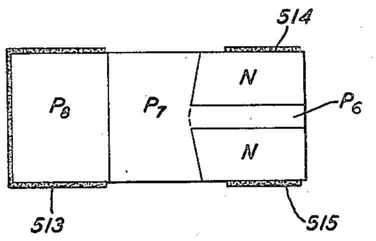
Fig. 12 illustrates a modification of the device shown in Fig. 8.

The structure illustrated in Fig. 12 is similar to that shown in Fig. 5 and described heretofore but includes features involving gradation of conductivity of the semiconductive material in accordance with the principles disclosed in the application, Serial No. 35,423, filed June 26, 1948, of W. Shockley, now Patent 2,569,347, granted September 25, 1951. The device comprises a thin layer $P_6$ of P conductivity type between two surface regions or layers of N conductivity type to which N-type regions the emitter and collector connections 514 and 515 are made. It includes also a P-type region $P_7$, the junction between which and the N-type regions is tapered as shown, and a third P-type zone $P_8$. The conductivity of the zone $P_6$ should be less than that of the N-type regions in order to insure that the current across the junctions will be composed primarily of electrons. Further, in order to increase the resistance of the junctions between the N-type regions and the P-type region $P_7$, the latter is made strongly P-type. The tapering of the transition region between $P_7$ and the N zones reduces the capacity of the junctions. An ohmic base connection 513 is made to the P region $P_8$.

Figure 13:
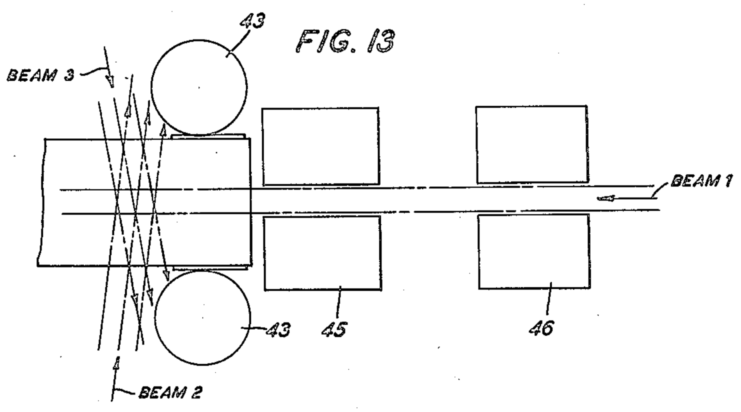
Fig. 13 is a diagram depicting one way in which the semiconductive body in the device of Fig. 12 may be formed.

A semiconductive body having zones as illustrated in Fig. 12 may be produced by subjecting a body of N conductivity type germanium to bombardment by three or more beams of nuclear particles in the manner illustrated in Fig. 13. Beam 1, as illustrated, is directed against one end of the body through collimating members 45 and 46, the orientation of which may be varied to control the width of the area of the body impinged by the nuclear particles. This bombardment will convert a thin layer of the N-type body corresponding to the zone $P_6$ in Fig. 12 to P conductivity type. The N-type body may be bombarded by beams 2 and 3, for example in the directions illustrated in Fig. 13, to produce the tapered region $P_7$ of Fig. 12. To assure the desired taper opposite faces of the body may be masked from the beams by cylindrical shields 43 impervious to the bombarding particles. Finally, the portion of the body corresponding to the region $P_8$ may be bombarded more intensely, by beams similar to beams 2 and 3, than the zone or region $P_7$ to assure a low resistance ohmic contact at the base 513.

Figure 14A:
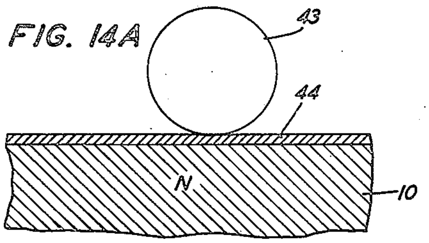
Figs. 14A, 14B and 14C illustrate another way in which restricted zones of N-type in a body of P-type material, such as shown in Fig. 1, may be produced.
Figure 14B:
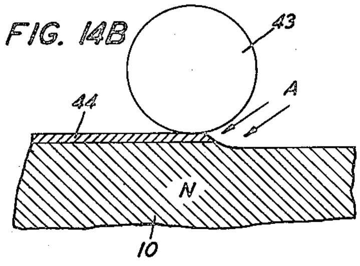
Figure 14C:
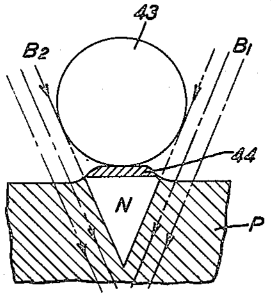

Restricted zones of N conductivity type in a P layer upon an N body, such as illustrated in Fig. 1, may be produced also in the manner illustrated in Figs. 14A, 14B and 14C. In the first step of the method, a wire 43 is affixed, as by soldering, to the metallic coating 44, for example of rhodium, upon the N-type germanium body 10. Then, as illustrated in Fig. 14B, a blast of abrasive material is directed against the coated body as indicated by the arrows A to remove a portion of the metal coating 44 and the adjacent surface region of the body. This step is repeated by directing the blast against the body to the other side of the wire 43 whereby, as illustrated in Fig. 14C, there is produced a strip of the coating material 44 upon the germanium body, the metal strip having affixed thereto the wire 43. Finally, as shown in Fig. 14C, nuclear particles are directed against the N-type body in the directions indicated by the arrows B1 and B2 whereby a surface layer of the body is converted to P-type material as has been described heretofore. The wire 43 shields the surface of the body from the bombarding particles whereby there is formed in the P layer a wedge-shaped region N of N conductivity type material. Such region may be utilized as either the collector or emitter or both in a signal translating device of the forms illustrated in Figs. 1 and 4 and described heretofore.

Although specific embodiments of the invention have been shown and described, it will be understood that they are but illustrative and that various modifications may be made therein without departing from the scope and spirit of this invention.

What is claimed is:

1. A signal translating device comprising a body of semiconductive material of one conductivity type having an integral layer on one face thereof, of the opposite conductivity type, said layer being of the order of 0.002 to 0.01 centimeter thick, a pair of spaced zones of said material and of said one conductivity type in the outer face portion only of said layer and terminating short of the inner face of said layer, and electrical connections to said zones and said layer.

2. A signal translating device comprising a body of N-type germanium having on one face thereof a layer of P-type germanium, said layer being of the order of 0.002 to 0.01 centimeter thick, a pair of spaced zones of N-type germanium in the outer face portion only of said layer and wholly spaced from said body by the underlying portions of said layer, and electrical connections to said layer and said zones.

3. A signal translating device comprising a body of semiconductive material of one conductivity type having at one face thereof an integral layer of the semiconductive material of the opposite conductivity type, a pair of spaced zones of said material and of said one conductivity type in the outer face portion only of said layer, said zones being isolated from the bulk of said body by said layer, a base connection to said layer at a region thereof spaced from said zones, ohmic connections to said zones, and a connection to said body.

4. A signal translating device comprising a body of semiconductive material of one conductivity type having at one face thereof a layer of said material but of the opposite conductivity type, a pair of spaced zones of said material and of said one conductivity type in the outer face portion of said layer, means biasing said layer in the reverse direction relative to said body, an input circuit connected between said layer and one of said zones, and an output circuit connected between said layer and the other of said zones.

5. A signal translating device comprising a body of semiconductive material of one conductivity type having on one face thereof a layer of said material but of the opposite conductivity type, a pair of spaced zones of said material and of said one conductivity type in the outer face portion of said layer, an ohmic connection to said layer at a region spaced from said zones, an input circuit connected between said ohmic connection and one of said zones, an output circuit connected between said ohmic connection and the other of said zones, and a source connected between said body and said connection and poled to bias the junction between said body and layer in the reverse direction.

6. A signal translating device in accordance with claim 5 comprising an ohmic accelerator connection to said layer.

7. A signal translating device comprising a body of N-type germanium having on one face thereof an integral layer of P-type germanium, a pair of spaced zones of N-type germanium in the outer surface portion of said layer and intermediate the ends thereof, an ohmic base connection to one end of said layer, means connected to said connection for biasing it negative with respect to said body, an input circuit connected between said base connection and one of said zones, and an output circuit connected between said base connection and the other of said zones.

8. A signal translating device in accordance with claim 7 wherein the portion of said layer adjacent said base connection is of more intense P-type than the remainder of said layer.

9. A signal translating device in accordance with claim 7 comprising a second ohmic connection to said layer adjacent the other end thereof, and source means for biasing said second ohmic connection negative with respect to said body and at a potential less than that of said base connection.

WILLIAM SHOCKLEY.

References Cited in the file of this patent

UNITED STATES PATENTS

| Number | Name | Date |
|---|---|---|
| 917,191 | Trivelli | Apr. 6, 1909 |
| 1,810,539 | Sokoloff | June 16, 1931 |
| 1,877,140 | Lilienfeld | Sept. 13, 1932 |
| 2,161,985 | Szilard | June 13, 1939 |
| 2,402,661 | Ohl | June 25, 1946 |
| 2,524,035 | Bardeen | Oct. 3, 1950 |
| 2,600,500 | Haynes et al. | June 17, 1952 |